United States Patent
Lu et al.

(10) Patent No.: US 9,552,132 B2
(45) Date of Patent: Jan. 24, 2017

(54) APPLICATION PROGRAM PREVIEW INTERFACE AND OPERATION METHOD THEREOF

(71) Applicant: ASUSTeK COMPUTER INC., Taipei (TW)

(72) Inventors: Meng-Ju Lu, Taipei (TW); Hao-Ping Lin, Taipei (TW); Ya-Ting Chen, Taipei (TW); Yi-Ou Wang, Taipei (TW); Yi-Lung Tsai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 168 days.

(21) Appl. No.: 14/102,321

(22) Filed: Dec. 10, 2013

(65) Prior Publication Data

US 2014/0173502 A1 Jun. 19, 2014

(30) Foreign Application Priority Data

Dec. 17, 2012 (TW) .............................. 101147869 A

(51) Int. Cl.
*G06F 3/0481* (2013.01)
(52) U.S. Cl.
CPC ... *G06F 3/0481* (2013.01); *G06F 2203/04803* (2013.01)
(58) Field of Classification Search
CPC .................................................. G06F 3/0481
See application file for complete search history.

(56) References Cited

U.S. PATENT DOCUMENTS

| | | | | |
|---|---|---|---|---|
| 7,769,794 B2* | 8/2010 | Moore | .............. | G06F 17/30126 707/822 |
| 8,819,571 B2* | 8/2014 | Robert | ................ | G06F 3/04817 715/769 |
| 8,904,271 B2* | 12/2014 | Evans | ............... | G06F 17/30017 715/206 |
| 2005/0289109 A1* | 12/2005 | Arrouye | ................ | G06F 17/301 |
| 2006/0036568 A1* | 2/2006 | Moore | .............. | G06F 17/30126 |
| 2008/0307351 A1* | 12/2008 | Louch | ................... | G06F 3/0481 715/782 |
| 2010/0269060 A1 | 10/2010 | Bandholz et al. | | |
| 2010/0313164 A1* | 12/2010 | Louch | ................... | G06F 3/0481 715/790 |
| 2011/0173538 A1* | 7/2011 | Robert et al. | ................. | 715/720 |
| 2012/0084644 A1* | 4/2012 | Robert | .............. | G06F 17/30126 715/255 |
| 2012/0084713 A1* | 4/2012 | Desai | .................... | G06F 3/0481 715/788 |

(Continued)

FOREIGN PATENT DOCUMENTS

TW 200622895 7/2006
TW 201104555 A1 2/2011

*Primary Examiner* — Anil Bhargava
(74) *Attorney, Agent, or Firm* — Muncy, Geissler, Olds & Lowe PC

(57) ABSTRACT

An operation method for application program preview interface which is stored in a storage unit and executed in a computer system. The operation method includes the steps of: displaying a plurality of operation modes on a first display area; selecting one of the operation modes in accordance with a first indicating signal; and displaying at least one selectable object on a second display area, wherein the selectable object is an application program opened or executed in the selected operation mode.

9 Claims, 6 Drawing Sheets

(56) References Cited

U.S. PATENT DOCUMENTS

2012/0284624 A1* 11/2012 Ording ................ G06F 3/04817
715/719
2015/0067608 A1* 3/2015 Robert ................ G06F 3/04817
715/835

* cited by examiner

APPLICATION PROGRAM PREVIEW INTERFACE AND OPERATION METHOD THEREOF

CROSS-REFERENCE TO RELATED APPLICATION

This application claims the priority benefit of TW application serial NO. 101147869, filed on Dec. 17, 2012. The entirety of the above-mentioned patent application is hereby incorporated via reference herein and made a part of specification.

BACKGROUND OF THE INVENTION

Field of the Invention

This disclosure relates to a user interface and an operation method thereof and, more particularly to an application program preview interface and an operation method thereof.

Description of the Related Art

A user can control and operate more intuitively via a graphical user interface (GUI). With the development of science, a computer system has various functions, thus the icons representing different programs that displayed on the user interface increase gradually. For users to browse all opened (executed) programs, a program preview interface is provided for the user to browse each opened program or switch to one of the opened programs.

However, the conventional program preview interface only provides simple browse function and switch function, and the programs executed in various operation modes cannot be classified. Moreover, the user cannot manage and classify the running program completely and effectively on the conventional program preview interface.

BRIEF SUMMARY OF THE INVENTION

An application program preview interface and an operation method thereof are provided. When one of multiple operation modes displayed on a first display area is selected, selectable objects corresponding to the selected operation mode are displayed in a second displayed area, and the user can browse and manage the classified and grouped application programs which are opened or executed.

In the operation method of the application program preview interface, the application program preview interface is stored in a storage unit and executed in a computer system. The operation method includes: displaying multiple operation modes in a first displayed area; selecting one of the operation modes according to an index signal; displaying at least one selectable object in a second display area, and the object is an application program which is opened or executed in the selected mode.

The application program preview interface is stored in a storage unit and executed in a computer system. The application program preview interface includes the first display area and the second display area. The first display area displays at least one operation mode that can be selected, and each operation mode includes at least one opened or executed application program. The second display area displays at least one selectable object, and the object is the application program in the selected operation mode.

In sum up, according to the application program preview interface and the operation method thereof when one of the multiple operation modes displayed in the first display area is selected, the selectable objects in the selected mode are displayed in the second area, and the user can browse the classified and grouped application programs which are opened or executed. Moreover, the selectable object displayed in the second display area can be managed directly and operated by the user intuitively, and the application program which is opened or executed can be managed effectively and completely.

DETAILED DESCRIPTION OF THE EMBODIMENTS

An application program preview interface is stored in a storage unit in a manner of an application program and executed by a computer system. The storage unit may be a random access memory (RAM), a read only memory (ROM), an electrically erasable programmable read only memory (EEPROM), a cache memory, an optical disk, a magnetic storage device or a solid state hard drive (SSD). Moreover, the computer system may be a desktop computer, a notebook computer, a tablet computer or a handheld electronic device (such as a mobile phone, a multimedia player), which is not limited herein.

Figure 1A:
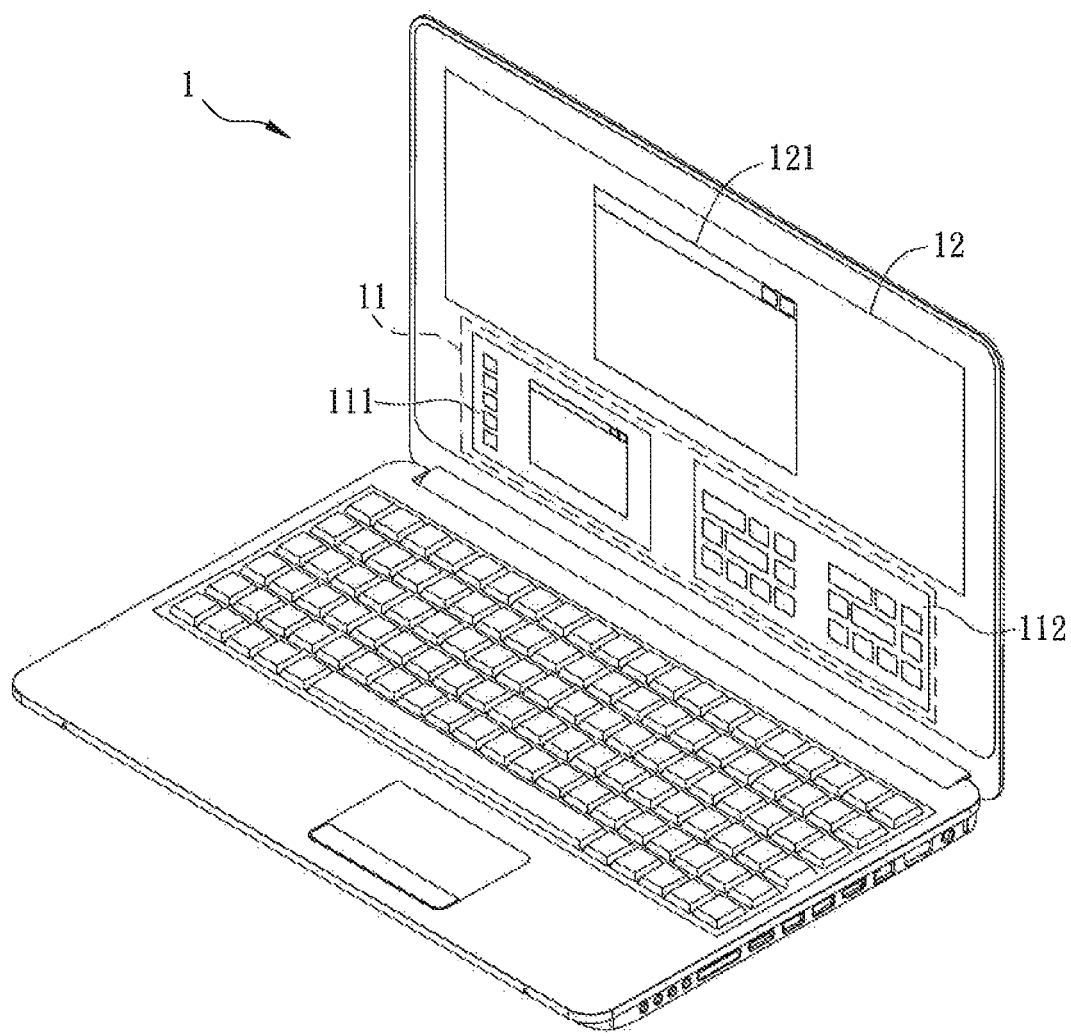
FIG. 1A and FIG. 1B are schematic diagrams showing an application program preview interface in one embodiment.

FIG. 1A is a schematic diagram showing an application program preview interface 1 in one embodiment. In this embodiment, the application program preview interface 1 is executed by a notebook computer and displayed on a display of the notebook computer. The application program preview interface 1 includes a first display area 11 and a second display area 12. The first display area 11 displays a first operation mode 111 and a second operation mode 112 by showing corresponding graphic objects. The first operation mode 111 may be a desktop mode, and the second operation mode 112 may be a modern mode.

The second display area 12 shows the first operation mode 111 or the second operation mode 112 according to an index signal, and the second display area 12 displays a selectable object 121 which is executed in the selected operation mode. The selectable object 121 is an application program which is opened (in execution) in the selected mode.

Furthermore, the index signal may be a signal generated by an input device such as a mouse, a keyboard or a remote control device, and it also may be a touch signal generated by clicking or touching a touch panel via a finger or a stylus. The "clicking" may be a selecting operation by clicking via a cursor, a finger or a stylus, or a browse operation by suspending the cursor above the first operation mode 111 or the second operation mode 112.

Additionally, in this embodiment, the first display area 11 displays two different operation modes, which is not limited, the number of operation modes displayed at the first display area 11 can be changed according to actual demands of products. Furthermore, the display positions of the first display area 11 and the second display area 12 can be changed according to demands, for example, the first display area 11 may be above, below, on the left of or on the right of the second display area 12, which is not limited.

Figure 1B:
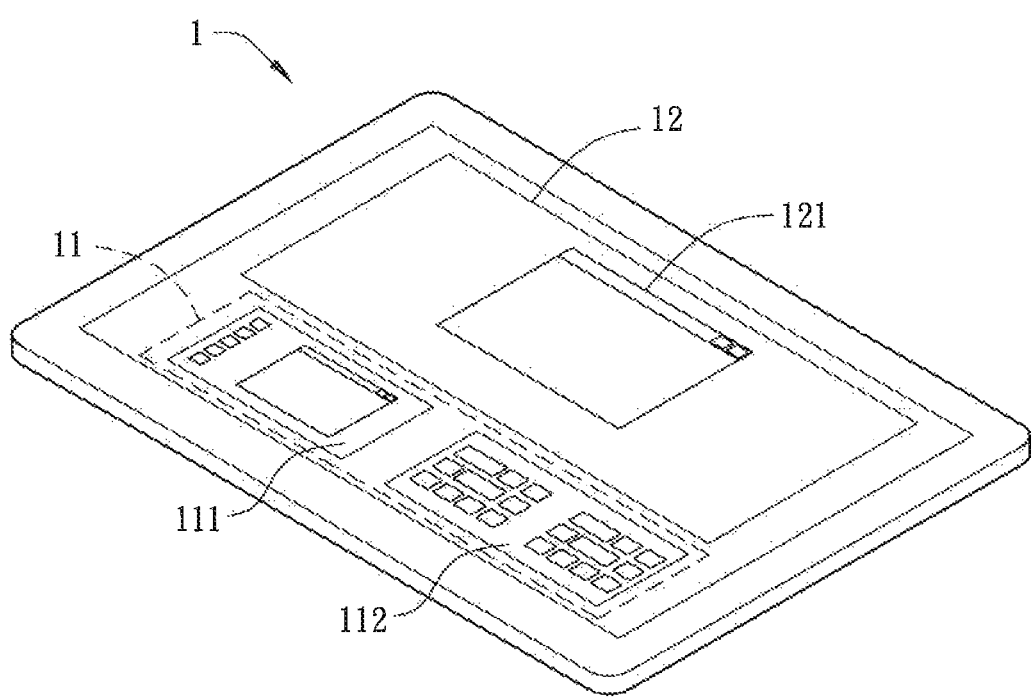

As shown in FIG. 1B, the application program interface 1 also can be executed by the tablet computer and displayed on the display of the tablet computer for the user to operate.

Figure 2A:
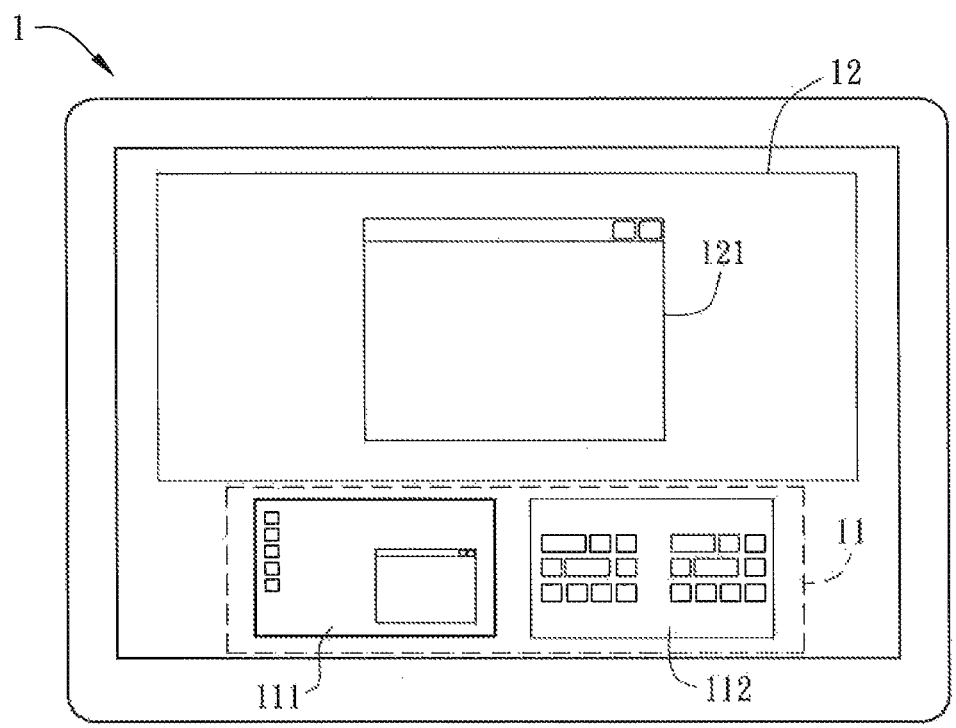
FIG. 2A to FIG. 2F are schematic diagrams showing an operation of an application program preview interface in an embodiment.

The application program preview interface 1 is further illustrated accompanying FIG. 2A to FIG. 2F. When the computer system starts the application program preview function, the display of the computer system displays the application program preview interface 1. When the index signal selects the first operation mode 111 representing a desktop mode, as shown in FIG. 2A, the second display area displays the selectable object 121 (such as an application program) executed in the first operation mode 111, and the content of the selectable object 121 displayed in the second display area 12 is same to that of the displayed application program opened or executed in the corresponding mode.

For example, if the user open a web browser to browse in the desktop mode and a page is displayed, when the computer system enters into the application program preview function, the content of the selectable object 121 displayed in the second display area 12 is the page displayed by the web browser in the desktop mode.

Figure 2B:
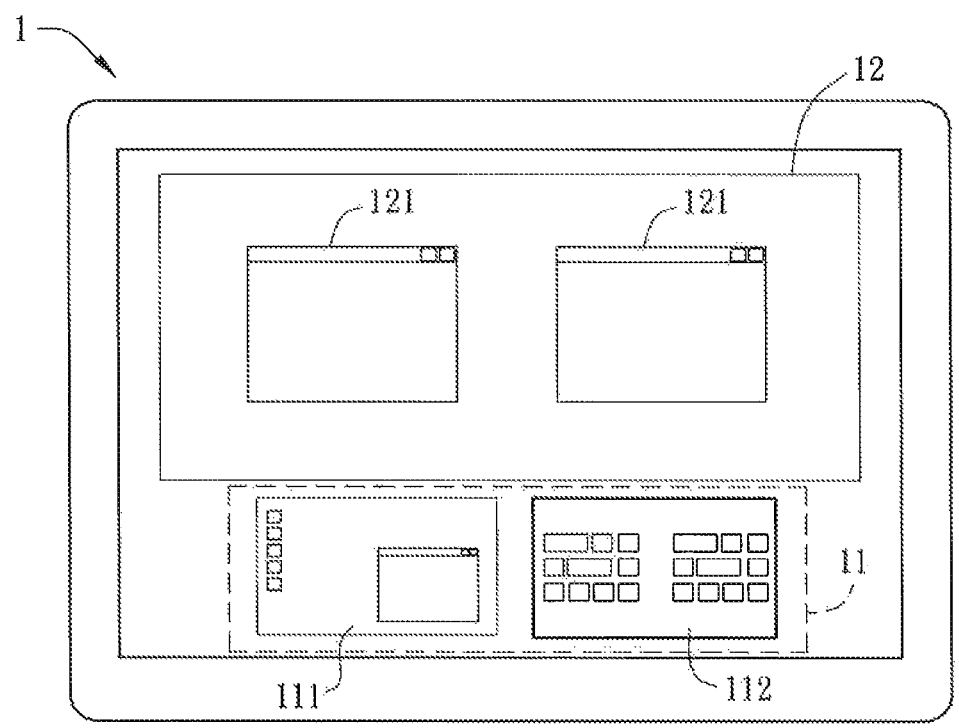

As shown in FIG. 2B, when the index signal selects the second operation mode 112 representing a new module, the selectable object 121 displayed in the second display area 12 is corresponding to the application program executed in the second operation mode 112.

Figure 2C:
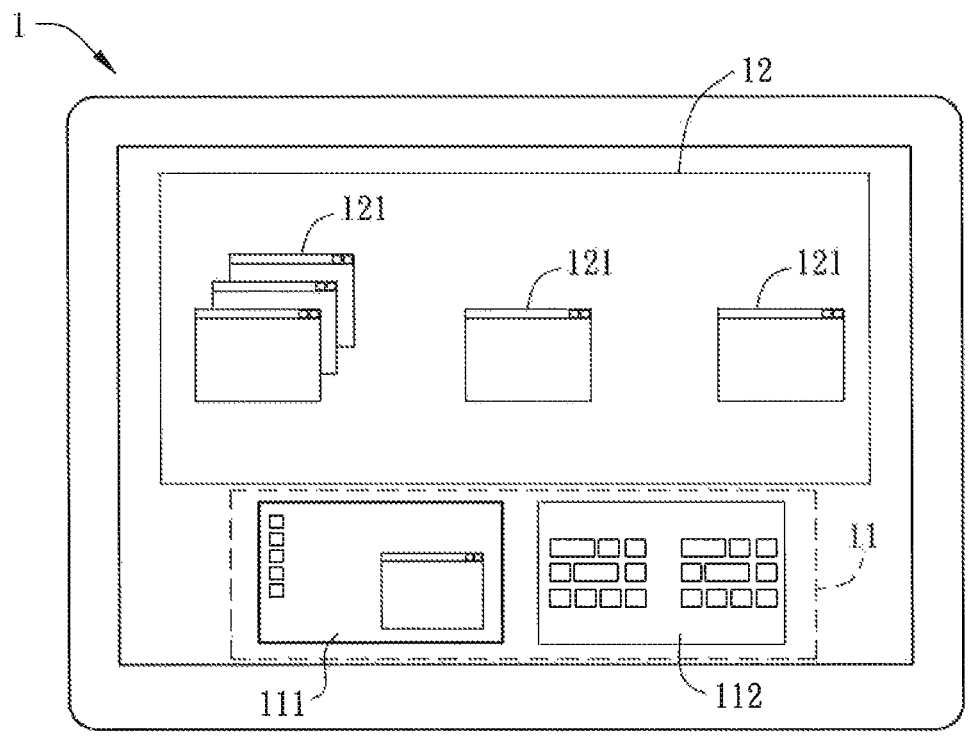

As shown in FIG. 2C, when the index signal selects the first operation mode 111 representing the desktop mode and multiple selectable objects 121 are executed in the first operation mode 111, the second display area 12 make the selectable objects 121 conforming to a defined condition shown in a stacking way to form a group.

In other words, when the selectable objects 121 in execution are multiple, the second display area 12 sorts to display the application programs, the application programs of a sort is displayed in a stacking way, the application programs of different sorts are displayed in a spreading way at intervals. The defined condition includes a file path, a file name, a file type or a file format, and the defined condition can be determined by the user.

Figure 2D:
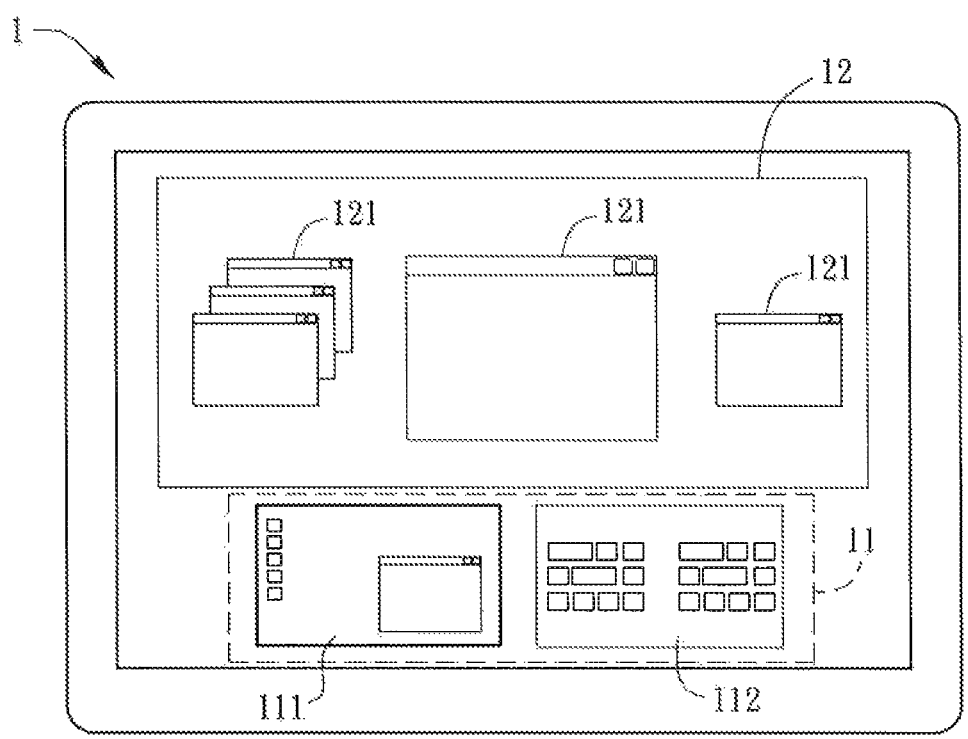

As shown in FIG. 2D, when the index signal (such as the mouse cursor) moves to the selectable object 121 in the second display area 12, the selectable object 121 is zoomed in, other objects are zoomed out, or the periphery of the selectable object 121 shows a specific border or color to make the user confirm the selected operation mode clearly.

Figure 2E:
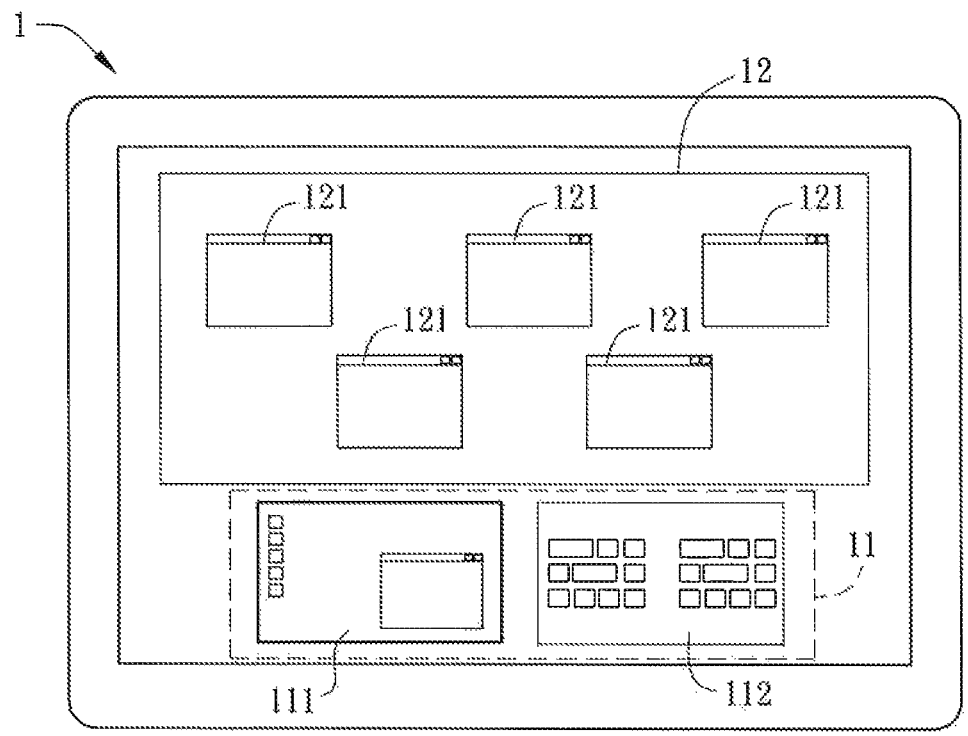

As shown in FIG. 2E, when the application program preview interface 1 selects the selectable objects 121 which are displayed in the second display area 12 in the stacking way according to the index signal, the selectable objects 121 which are selected are displayed in the second display area 12 in the spreading way at intervals.

Figure 2F:
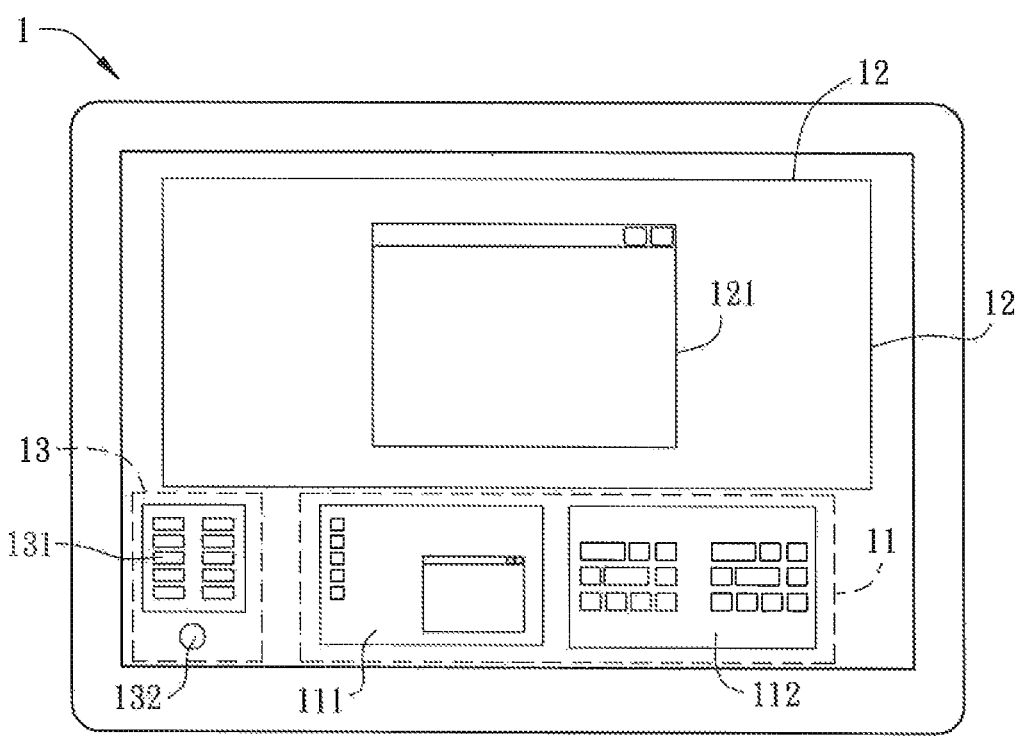

Moreover, as shown in FIG. 2F, the application program preview interface 1 further includes a third display area 13 to display a list 131 or a program shortcut icon 132 of all programs corresponding to the first operation mode 111 and the second operation mode 112. In one embodiment, the application programs in the list 131 displayed in the third display area 13 include all application programs installed on the computer system, the program shortcut icon 132 is an icon formed by dragging the selectable object 121 displayed in the second display area 12 or by other settings, and the user can open or browse the selectable object 121 represented by the program shortcut icon 132 directly.

In the preview interface, the selectable object 121 can be managed in the second display area 12 according to an operation signal. For example, the selectable object 121 is closed directly by clicking a close symbol of the selectable object 121 or a specific touch trace or a specific gesture. The content of the selectable object 121 can be displayed directly, for example, when the selectable object 121 is a play application program, it can be operated directly at the preview interface. When multiple selectable objects are displayed in the second display area, the sequence of the selectable object 121 can be changed by dragging to adjust the position of the selectable objects 121. The size of the selectable object 121 can be zoomed in or out by dragging the corner of the selectable object 121. The text content of the selectable object 121 also may be edited. Additionally, the application program preview interface 1 includes a recovery option to back to a previous operation or an original state in order to avoid the misoperation of the user.

Figure 3:
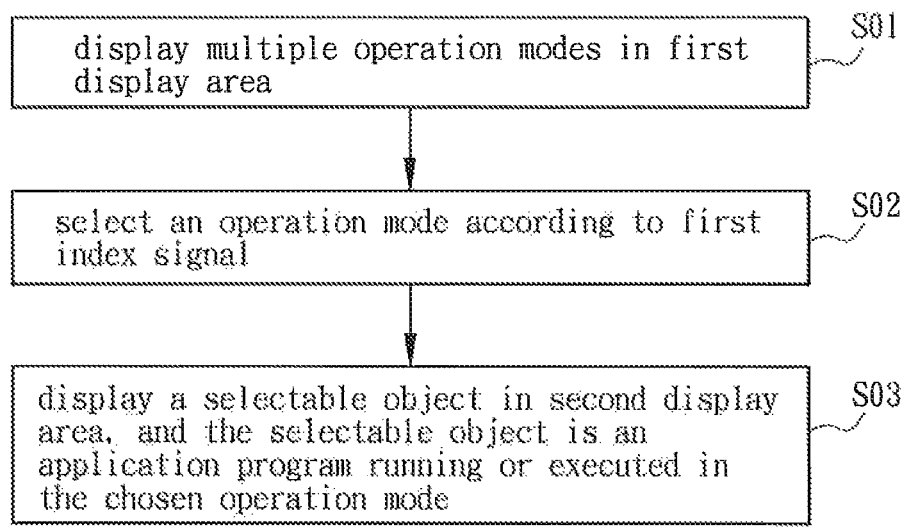
FIG. 3 is a flowchart showing an operation method of an application program preview interface in one embodiment.

Then, an operation method is illustrated in a flowchart in FIG. 3 cooperating with the embodiments in FIG. 2A to 2F. The operation method includes steps S01 to S03.

In Step S01, multiple operation modes are displayed in the first display area 11. In this embodiment, when the computer system starts the application program preview function, the display of the computer system displays the application program preview interface 1. The first display area 11 of the application program preview interface 1 displays multiple operation modes.

In Step S02, an operation mode is selected according to a first index signal. In this embodiment, the user can select one from the operation modes via the input device.

In Step S03, the second display area 12 displays the selectable object 121. The selectable object is the application program opened or executed in the selected mode.

In sum up, in the application program preview interface and the operation method thereof, when one of the multiple operation modes displayed in the first display area is selected, the selectable object corresponding to the selected operation mode is displayed in the second display area, and the user can browse the classified or grouped program which is opened or executed. Moreover, the object displayed in the second display area can be managed directly and operated by the user intuitively, and the application program which is opened or executed can be managed effectively and completely.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A computing device, comprising:
  a display unit; and
  a processor configured to define an application program preview interface displayed on the display unit, wherein the application program preview interface comprises:
  a first display area simultaneously displaying thumbnails of desktop layouts of multiple operation modes on the display unit by showing graphic objects, wherein each of the operation modes includes an application program which is opened or executed, and run within the selected mode;
  a second display area displaying a selectable object as an application preview, wherein the selectable object is corresponding to the application program included in a selected operation mode;

a third display area displaying a list or a program shortcut icon of all the application programs corresponding to the selected operation mode, wherein when the selectable object is displayed in the second display area, the multiple operation modes are displayed in the first display area, and wherein the first display area and the second display area are simultaneously displayed on the display unit, and wherein the application modes comprise a desktop mode and a modern mode.

2. The computing device according to claim 1, wherein the content of the selectable object is corresponding to the application program which is opened or executed at the corresponding operation mode.

3. The computing device according to claim 1, wherein when multiple selectable objects are displayed in the second display area, the selectable objects are classified at the second display area according to a defined condition, and the selectable objects conforming to the defined condition are in a group.

4. The computing device according to claim 3, wherein the defined condition includes a file path, a file name, a file type, a file creation time or a file format.

5. The computing device according to claim 3, wherein the content of the classified selectable objects which conform to a same defined condition are shown in a stacking way or a spreading way.

6. The computing device according to claim 3, wherein when the selectable objects conforming to a same defined condition are selected, the selectable objects are shown at the second display area in a spreading way.

7. The computing device according to claim 1, wherein the selectable object is directly managed in the second display area via an operation signal, and the operation signal includes closing, playing, moving, zooming in, zooming out or text editing the content of the selectable object.

8. The computing device according to claim 1, wherein when an index signal is moved to one of the selectable objects in the second display area, the selectable object is zoomed in and displayed or the selectable object is displayed with a different border color.

9. An operation method of an application program preview Interface, wherein the application program preview interface is stored in a storage unit and executed in a computer system; the operation method comprising:

displaying thumbnails of desktop layouts of multiple operation modes in a first display area of the application program preview interface by showing graphic objects, simultaneously;

selecting one from the operation modes according to an index signal; and displaying a selectable object as an application preview in a second display area, wherein the selectable object is an application program which is opened or executed at a selected mode, and run within the selected mode;

displaying, in a third display area, a list or a program shortcut icon of all the application programs corresponding to the selected operation mode;

wherein when the selectable object is displayed in the second display area, the multiple operation modes are displayed in the first display area, and the first display area and the second display area are simultaneously displayed on the display unit, and wherein the operation modes comprise a desktop mode and a modern mode.

* * * * *